(12) United States Patent
Lin et al.

(10) Patent No.: US 9,628,251 B2
(45) Date of Patent: Apr. 18, 2017

(54) UE MEASUREMENT ENHANCEMENT IN ADAPTIVE TDD CONFIGURATION NETWORKS

(71) Applicant: MEDIATEK, INC., Hsin-Chu (TW)

(72) Inventors: Shiang-Jiun Lin, Hsinchu (TW); Chien-Hwa Hwang, Hsinchu County (TW); Xiangyang Zhuang, Lake Zurich, IL (US)

(73) Assignee: MEDIATEK, INC., Hsin-Chu (TW)

( * ) Notice: Subject to any disclaimer, the term of this patent is extended or adjusted under 35 U.S.C. 154(b) by 19 days.

(21) Appl. No.: 14/089,334

(22) Filed: Nov. 25, 2013

(65) Prior Publication Data

US 2014/0146696 A1    May 29, 2014

Related U.S. Application Data

(60) Provisional application No. 61/731,056, filed on Nov. 29, 2012.

(51) Int. Cl.
*H04W 24/08* (2009.01)
*H04L 5/14* (2006.01)
(Continued)

(52) U.S. Cl.
CPC .............. *H04L 5/14* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS

2009/0312008 A1* 12/2009 Lindoff et al. ................ 455/423
2010/0232311 A1*  9/2010 Zhang et al. ................. 370/252
(Continued)

FOREIGN PATENT DOCUMENTS

CN    101933259 A    1/2008
CN    102186188 A    4/2011
(Continued)

OTHER PUBLICATIONS

International Search Report and Written Opinion of International Search Authority for PCT/CN2013/088028 dated Feb. 20, 2014 (14 pages).
(Continued)

*Primary Examiner* — Robert C Scheibel
(74) *Attorney, Agent, or Firm* — Imperium Patent Works; Zheng Jin (57) ABSTRACT

Methods for UE measurement enhancement in an adaptive TDD configuration network are proposed. In a first solution, the network provides an adaptive TDD indicator to the UE. In a second solution, the network provides an instantaneous TDD configuration to the UE. In a third solution, multiple TDD configurations are grouped as one TDD group, and the network adapts TDD configurations within the same TDD group. In a fourth solution, the network broadcasts a TDD reference configuration in SIB1, and adapts to another TDD configuration with DL super set constraint, i.e., the DL subframes of the other TDD configuration form a super set of the DL subframes of the broadcasted TDD reference configuration.

18 Claims, 7 Drawing Sheets

(51) Int. Cl.
*H04W 72/04* (2009.01)
*H04W 72/12* (2009.01)
*H04L 12/923* (2013.01)
*H04L 5/00* (2006.01)

(52) U.S. Cl.
CPC .......... *H04L 5/0094* (2013.01); *H04L 5/1469* (2013.01); *H04L 47/762* (2013.01); *H04W 72/04* (2013.01); *H04W 72/044* (2013.01); *H04W 72/0446* (2013.01); *H04W 72/12* (2013.01); *H04W 72/1205* (2013.01); *H04W 72/1252* (2013.01)

(56) References Cited

U.S. PATENT DOCUMENTS

| | | | |
|---|---|---|---|
| 2011/0128872 A1* | 6/2011 | Lindoff | H04J 11/0069 370/252 |
| 2013/0188533 A1* | 7/2013 | He | H04J 3/1605 370/280 |
| 2013/0258938 A1* | 10/2013 | Sagfors et al. | 370/312 |
| 2013/0301492 A1* | 11/2013 | Ji | H04W 72/042 370/280 |
| 2013/0336177 A1* | 12/2013 | Gao et al. | 370/280 |
| 2014/0036738 A1* | 2/2014 | Kim et al. | 370/280 |
| 2014/0119261 A1* | 5/2014 | Wang et al. | 370/312 |
| 2015/0043392 A1* | 2/2015 | Susitaival et al. | 370/280 |

FOREIGN PATENT DOCUMENTS

| | | |
|---|---|---|
| CN | 102215534 A | 5/2011 |
| EP | 2685646 A2 | 3/2011 |
| EP | 2690806 A2 | 3/2011 |
| WO | WO2012113131 A1 | 2/2011 |
| WO | WO2012118345 A2 | 3/2011 |
| WO | WO2012128599 A2 | 3/2011 |

OTHER PUBLICATIONS

EPO, Search Report for the EP patent application 13858617.7 dated Jun. 2, 2015 (8 pages).
R1-122363 3GPP TSG-RAN WG1 Meeting #69; Renesas Mobile Europe Ltd.; Discussion on Enhancements for Dynamic TDD UL-DL Configuration; Prague, Czech Republic dated May 21-25, 2012 (4 pages).
R1-122909 3GPP TSG RAN WG1 Meeting #69; Huawei et al.; Methods to Support Different Time Scales for TDD UL-DL Reconfiguration; Prague, Czech Republic dated May 21-25, 2012 (4 pages).
R1-122267 3GPP TSG RAN WG1 Meeting #69; Samsung; Dynamic Reconfiguration of TDD UL-DL Configuration; Prague, Czech Republic dated May 21-25, 2012 (2 pages).
R1-122266 3GPP TSG RAN WG1 Meeting #69; Samsung; Semi-Static Reconfiguration of TDD UL-DL Configuration; Prague, Czech Republic dated May 21-25, 2012 (2 pages).
EPO, Search Report for the EP patent application 15176612.8 dated Sep. 25, 2015 (8 pages).

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

SOLUTION 1 – ADAPTIVE TDD INDICATION

FIG. 5

SOLUTION 2 – INSTANTANEOUS TDD CONFIGURATION

FIG. 6

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

701 TDD GROUP #1
702 TDD GROUP #2

SOLUTION 3 – TDD GROUPS

FIG. 7

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

801 TDD reference config
802 TDD reference config

SOLUTION 4 – SUPER SET OF DL SUBFRAMES

FIG. 8

| NOTIFICATION METHOD | TYPE OF UE | TDD CONFIG KNOWLEDGE TO UE | UE MEASUREMENT |
|---|---|---|---|
| DEDICATED SIGNALING (RRC OR MAC OR PDCCH) | RRC CONNECTED UE | KNOW TDD CONFIGURATION | PERFORM MEASUREMENTS ACCORDING TO TDD CONFIG |
| | RRC IDLE UE | MAY KNOW ADAPTIVE TDD CELL BUT DO NOT KNOW TDD CONFIGURATION | PERFORM MEASUREMENTS ON UNCHANGEABLE DL SUBFRAMES |
| | NEIGHBOR RRC CONNECTED UE | | |
| | NEIGHBOR RRC IDLE UE | | |
| SYSTEM INFORMATION CHANGE | RRC CONNECTED UE | KNOW TDD CONFIGURATION | PERFORM MEASUREMENTS ACCORDING TO TDD CONFIG IF KNOWN, OR PERFORM ON UNCHANGEABLE DL SUBFRAMES |
| | RRC IDLE UE | | |
| | NEIGHBOR RRC CONNECTED UE | IF NOTIFIED BY X2-AP | PERFORM MEASUREMENTS ACCORDING TO TDD CONFIG IF SAME AS SERVING CELL, OR PERFORM ON UNCHANGEABLE SUBFRAMES |
| | NEIGHBOR RRC IDLE UE | | |
| EMBEDDED IN REFERENCE SIGNAL | RRC CONNECTED UE | KNOW TDD CONFIGURATION | ONCE THE FRAME BOUNDARY IS DETERMINED, UE FIRST DETECTS REFERENCE SIGNALING IN SUBFRAME 0 AND 5 TO DETERMINED TDD CONFIGURATION, AND THEN PERFORM MEASUREMENTS ACCORDINGLY |
| | RRC IDLE UE | | |
| | NEIGHBOR RRC CONNECTED UE | | |
| | NEIGHBOR RRC IDLE UE | | |
| TDD GROUPING AND/OR DL SUPER SET CONSTRAINT WITH DEDICATED SIGNALING | RRC CONNECTED UE | KNOW TDD CONFIGURATION | PERFORM MEASUREMENTS ACCORDING TO TDD CONFIG |
| | RRC IDLE UE | KNOW TDD CONFIGURATION IN SIB1 | PERFORM MEASUREMENTS ACCORDING TO TDD CONFIG IN SIB1 |
| | NEIGHBOR RRC CONNECTED UE | MAY KNOW TDD CONFIGURATION IN SIB1 | PERFORM MEASUREMENTS ACCORDING TO TDD CONFIG IN SIB1 OR PERFORM MEASUREMENTS ON UNCHANGEABLE SUBFRAMES |
| | NEIGHBOR RRC IDLE UE | | |

UE MEASUREMENT ENHANCEMENT IN ADAPTIVE TDD CONFIGURATION NETWORKS

CROSS REFERENCE TO RELATED APPLICATIONS

This application claims priority under 35 U.S.C. §119 from U.S. Provisional Application No. 61/731,056, entitled "UE Measurement Enhancement in Adaptive TDD Configuration Networks," filed on Nov. 29, 2012, the subject matter of which is incorporated herein by reference.

TECHNICAL FIELD

The present invention relates generally to wireless communication systems and, more particularly, to adaptive Time Division Duplex (TDD) configuration and UE measurement enhancement in LTE systems.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each radio frame having the same frame length with the same number of subframes. The subframes are configures to perform uplink (UL) transmission or downlink (DL) reception in different Duplexing methods. Time-division duplex (TDD) is the application of time-division multiplexing to separate transmitting and receiving radio signals. TDD has a strong advantage in the case where there is asymmetry of the uplink and downlink data rates. Seven different TDD configurations are provided in LTE/LTE-A systems to support different DL/UL traffic ratios for different frequency bands.

Figure 1:
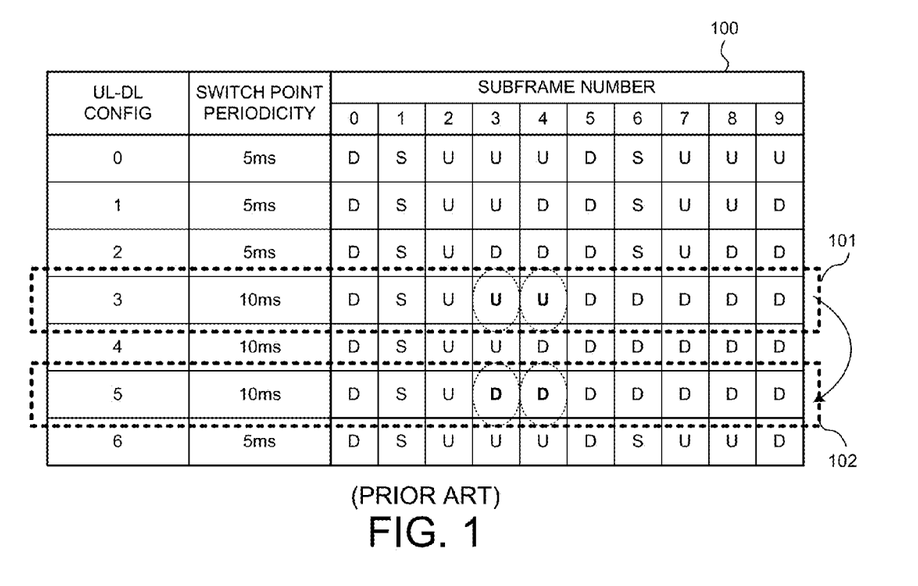
FIG. 1 (Prior Art) illustrates the TDD mode UL-DL configurations in an LTE/LTE-A system.

FIG. 1 (Prior Art) illustrates the TDD mode UL-DL configurations in an LTE/LTE-A system. Table 100 shows that each radio frame contains ten subframes, D indicates a DL subframe, U indicates an UL subframe, and S indicates a Special subframe/Switch point (SP). Each SP contains a DwPTS (Downlink pilot time slot), a GP (Guard Period), and an UpPTS (Uplink pilot time slot). DwPTS is used for normal downlink transmission and UpPTS is used for uplink channel sounding and random access. DwPTS and UpPTS are separated by GP, which is used for switching from DL to UL transmission. The length of GP needs to be large enough to allow the UE to switch to the timing advanced uplink transmission. These allocations can provide 40% to 90% DL subframes. Current UL-DL configuration is broadcasted in the system information block, i.e. SIB1. The semi-static allocation via SIB1, however, may or may not match the instantaneous traffic situation. Currently, the mechanism for adapting UL-DL allocation is based on the system information change procedure.

In 3GPP LTE Rel-11 and after, the trend of the system design shows the requirements on more flexible configuration in the network system. Based on the system load, traffic type, traffic pattern and so on, the system can dynamically adjust its parameters to further utilize the radio resource and to save the energy. One example is the support of dynamic TDD configuration, where the TDD configuration in the system may dynamically change according to the DL-UL traffic ratio. When the change better matches the instantaneous traffic situation, the system throughput will be enhanced. For example, in one scenario, multiple indoor Femto cells deployed on the same carrier frequency and multiple Macro cells deployed on an adjacent carrier frequency where all Macro cells have the same UL-DL configuration and the indoor Femto cells can adjust UL-DL configuration. In another scenario, multiple outdoor Pico cells deployed on the same carrier frequency and multiple Macro cells deployed on an adjacent carrier frequency where all Macro cells have the same UL-DL configuration and outdoor the Pico cells can adjust UL-DL configuration.

Although the system benefits from the flexible mechanism, the new mechanism also has impacts on the design of UE, such as UE measurement. In LTE, the UE measurement is an important mechanism to support cell selection or reselection, scheduling, and mobility. A measurement scheduler is designed to control the physical layer at UE to collect measurement samples, which can be the RSRP, RSRQ and/or RSSI of the reference signal. With the adaptive TDD configuration feature, the network can adjust the TDD pattern to better match the DL/UL traffic pattern. However, since TDD configuration may change frequently, UE measurement may be impacted if the TDD change is not sent to UEs in time. Therefore, the way to notify UEs on the TDD configuration change and the way of UE doing measurement are important. Otherwise, the incorrect or inaccurate measurement results may affect handover and cell reselection results.

Figure 2:
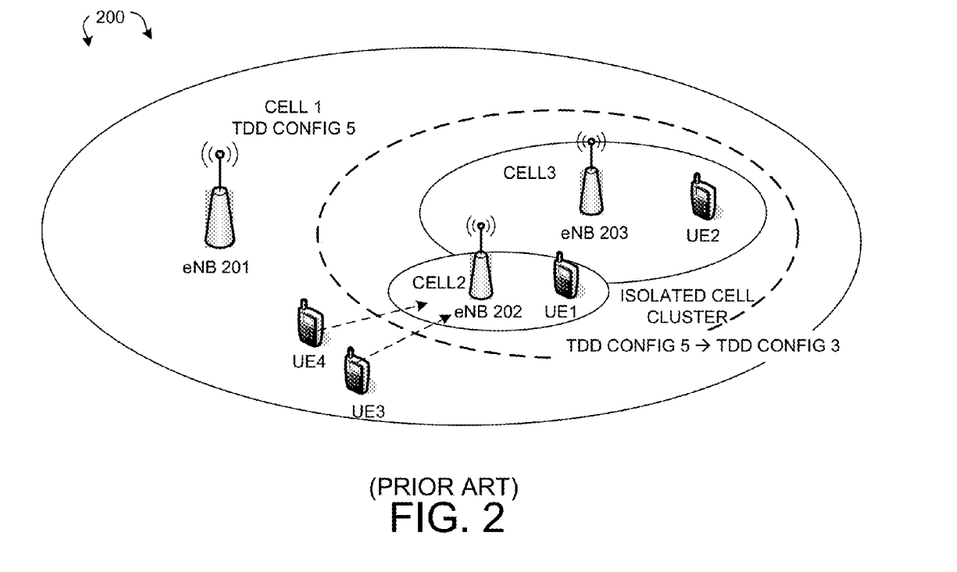
FIG. 2 (Prior Art) illustrates an LTE/LTE-A mobile communication system with adaptive TDD configuration.

FIG. 2 (Prior Art) illustrates an LTE/LTE-A mobile communication system 200 with adaptive TDD configuration. Mobile communication system 200 comprises a Macro base station eNB 201 serving Macro cell 1, base station eNB 202 serving small cell 2, and base station eNB 203 serving small cell 3. Cell 1 is a Macro cell and its TDD configuration is more static. Small Cells 2-3 are within the macro cell's coverage. Cell 2 and Cell 3 form an isolated cell cluster 1, where TDD configuration can be independently adjusted. All cells in an isolated cell cluster should apply the TDD configuration change together. In this example, assume cell 1 applies TDD configuration 5, which is configured semi-statically, and the isolated cell cluster, i.e. cell 2 and cell 3, originally applies TDD configuration 5. As more UL traffic is demanded in the isolated cluster, it changes the TDD configuration to TDD configuration 3.

Assuming there are four UEs in the system. UE1 is a RRC connected UE served by an adaptive TDD cell, e.g., cell 2; UE2 is a RRC idle UE camped on the other adaptive TDD cell, e.g., cell 3; UE3 is a neighbor cell RRC connected UE served by the macro cell, e.g., cell 1; and UE4 is a neighbor cell RRC idle UE camped on the macro cell, e.g., cell 1. The UEs may or may not know the TDD configuration change in the isolated cell cluster and thus the measurement results on the cells in the cluster may be influenced. For example, the TDD configuration change notification may be sent through a dedicated signaling, e.g., RRC signaling or MAC signaling or PDCCH signaling. As a result, UE1 may know the new TDD configuration pattern while UE2, UE3, and UE4 may not know this information due to not receiving the dedicated signaling.

In a first scenario, an RRC connected mode UE (e.g., UE1) can successfully receive the TDD change notification so that it can measure on the exact DL subframes based on the notification.

In a second scenario, since the TDD change is notified by the dedicated signaling, an RRC idle mode UE (e.g., UE2) will not receive the notification. The measurement of UE2 will be impacted. Assume UE2 originally measures on subframes #0, #4, #8, which are DL subframes in TDD configuration 5 (depicted by box 101 in FIG. 1). However, subframe #4 is adjusted to UL subframe after the isolated cell cluster adopts TDD configuration 3 (depicted by box 102 in FIG. 1). When UE2 continue to measure subframe #4, it may lead to false alarm measurement if the power level of RBs carrying reference signal is large, thus affects UE2 doing cell reselection.

In a third scenario, a neighbor cell UE (e.g., UE3) who attempts to handover to the isolated cell cluster and performs the handover measurement may also be affected. If the adaptive TDD configuration is not real time updated to the neighbor cell, then the neighbor UE may do the measurement in the incorrect subframe and it may lead to incorrect measurement results. For example, UE3 moves towards cell 2 and performs measurement on cell 2. UE3 should measure Cell 2 in it measurement gap. Assume UE3 measures subframe #0, #3, #6, and #9 of cell 2 originally. If cell 2 changes to TDD configuration 3 without immediately updating to its neighbor cell, then UE3 in the neighbor cell may wrongly estimate cell 2's link quality because UE3 still measures subframe #3. Therefore, the handover event may be triggered at incorrect timing and the handover performance may degrade.

In a fourth scenario, UE4 is an RRC idle UE in the neighbor cell. Thus, UE4 may not know the instantaneous TDD change of its measured neighbor cell. The incorrect measurement on the neighbor cell may lead to incorrect cell reselection judgment.

A solution is sought.

SUMMARY

Methods for UE measurement enhancement in an adaptive TDD configuration network are proposed. In a first solution, the network provides an adaptive TDD indicator to the UE. The adaptive TDD indicator may be broadcasted in SIB, embedded in reference signaling, carried in RRC messaging, or exchanged between base stations through X2-AP. In a second solution, the network provides an instantaneous TDD configuration to the UE. The instantaneous TDD configuration may be broadcasted in SIB, carried in RRC messaging, carried by MAC control element, carried by PDCCH signaling, or embedded in reference signaling.

In a third solution, multiple TDD configurations are grouped as one TDD group, and the network adapts TDD configurations within the same TDD group. In a fourth solution, the network broadcasts a TDD reference configuration in SIB1, and adapts to another TDD configuration with DL super set constraint, i.e., the DL subframes of the other TDD configuration form a super set of the DL subframes of the broadcasted TDD reference configuration.

In one novel aspect, the UE detects whether a cell-specific reference signal (CRS) exists in concerned subframes before performing measurements.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
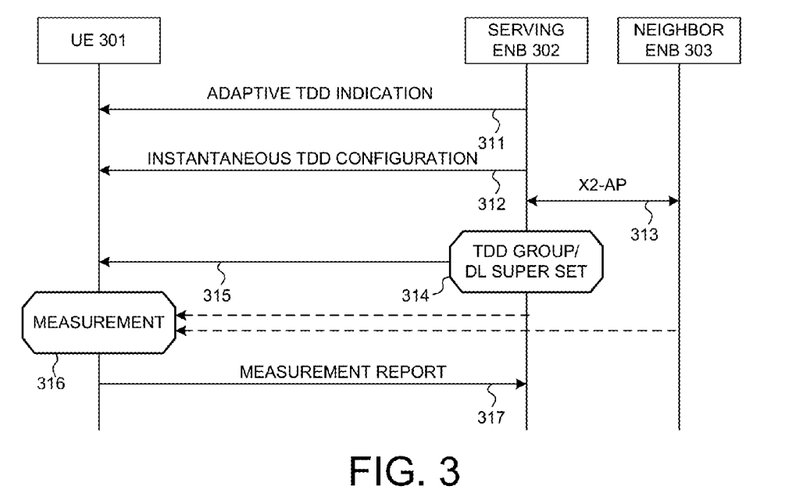
FIG. 3 illustrates an LTE/LTE-A mobile communication system with adaptive TDD configuration in accordance with one novel aspect.

FIG. 3 illustrates an LTE/LTE-A mobile communication system 300 with adaptive TDD configuration in accordance with one novel aspect. LTE system 300 comprises a user equipment UE 301, a serving base station eNB 302, and a neighbor base station eNB 303. The LTE system supports adaptive time division duplex (TDD) configuration, where the TDD configuration in the system may dynamically change according to the downlink-uplink (DL-UL) traffic ratio. Currently, the mechanism for adapting UL-DL allocation is based on the system information change procedure (e.g., broadcasting TDD configuration via SIB1). However, since TDD configuration may change frequently (e.g., TDD configuration switch is 10 ms most frequently), UE measurement may be impacted if the TDD change is not sent to UEs in time (e.g., SIB1 is updated at least 640 ms). Therefore, the way to notify UEs on the TDD configuration change and the way of UE doing measurement are important. Otherwise, the incorrect or inaccurate measurement results may affect handover and cell reselection performance.

In accordance with one novel aspect, the serving base station eNB 302 informs UE 301 TDD configuration information so that UE 301 is able to perform correct and accurate measurements. In one embodiment, eNB 302 sends an adaptive TDD indication of the serving cell to UE 301 (step 311), which indicates the cell capability of TDD configuration change. Once UE 301 receives the adaptive TDD indication from the cell, UE 301 interprets this indication as a sign that TDD configuration in the cell may be different from the TDD configuration in SIB1. As a result, UE 301 needs to be careful in performing measurements, because it still may not know the instantaneous TDD configuration of the cell. In another embodiment, eNB 302 sends the instantaneous TDD configuration of the serving cell to UE 301 (step 312). Once UE 301 receives the instantaneous TDD configuration, it overrides the TDD configuration in SIB1. UE 301 is then able to perform measurements based on the received instantaneous TDD configuration.

From the network perspective, serving eNB 302 and neighbor eNB 303 may exchange adaptive TDD capability with each other via X2-AP (step 313). For example, if eNB 302 receives an adaptive TDD indication from eNB 303, then eNB 302 should indicate this capability to its served/camped UEs. In one embodiment, TDD configurations may be divided into adaptive TDD groups, which are determined by eNB 302 in step 314. The TDD adaptation can adjust within a group. In another embodiment, eNB 302 may apply TDD adaptation with super set constraint. For example, the DL subframes of the instantaneous TDD configuration should be the super set of the DL subframes broadcasted in SIB1. In step 315, eNB 302 sends the adaptive TDD group and/or the TDD reference configuration with DL super set constraint information to UE 301. In step 316, UE 301 performs measurements following measurement configurations specified by RRC (for connected UE) or defined for cell reselection (for idle UE). Finally, in step 317, UE 301 sends a measurement report to eNB 302. Because UE 301 has the additional knowledge on adaptive TDD, UE 301 is able to perform measurements more correctly and accurately based on the adaptive TDD information.

Figure 4:
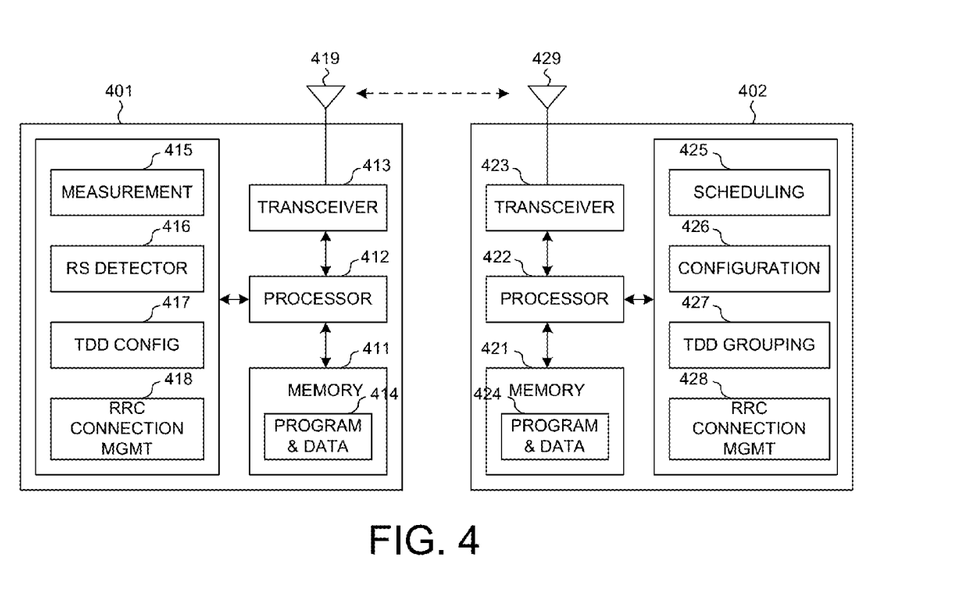
FIG. 4 is a simplified block diagram of a user equipment and a base station with adaptive TDD in accordance with one novel aspect.

FIG. 4 is a simplified block diagram of a user equipment UE 401 and a base station eNB 402 with adaptive TDD in accordance with one novel aspect. UE 401 comprises memory 411, a processor 412, an RF transceiver 413, and an antenna 419. RF transceiver 413, coupled with antenna 419, receives RF signals from antenna 419, converts them to baseband signals and sends them to processor 412. RF transceiver 413 also converts received baseband signals from processor 412, converts them to RF signals, and sends out to antenna 419. Processor 412 processes the received baseband signals and invokes different functional modules to perform features in UE 401. Memory 411 stores program instructions and data 414 to control the operations of UE 401. The program instructions and data 414, when executed by processor 412, enables UE 401 to access a mobile communication network for receiving adaptive TDD configuration information, and performing measurements accordingly.

UE 401 also comprises various function modules including a measurement module 415 that performs radio signal measurements, a reference signal (RS) detector 416 that detects various reference signals, a TDD configuration module 417 that determines adaptive TDD configuration, and an RRC connection management module 418 that performs cell (re)selection and RRC (re)establishment procedures. The different components and modules may be implemented in a combination of hardware circuits and firmware/software codes being executable by processor 412 to perform the desired functions. Similarly, base station eNB 402 comprises similar structures including various function modules to support related functionalities, e.g., to provide adaptive TDD configuration information to UEs and neighboring eNBs, to determine TDD groups, and/or to apply adaptive TDD with DL super set constraints.

Figure 5:
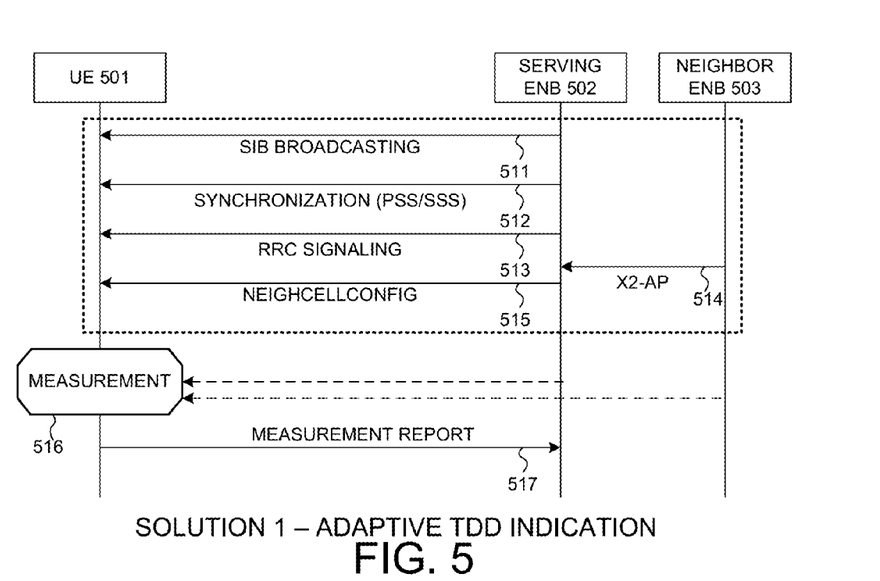
FIG. 5 illustrates a first solution of providing adaptive TDD indication.

FIG. 5 illustrates a first solution of providing adaptive TDD indication. The original TDD configuration pattern is broadcasted in SIB1 for idle mode UEs and is carried in the RRC message for connected mode UEs. In adaptive TDD systems, the TDD configuration may change more often than the SIB1 change. Hence, an efficient indication or notification method is needed for the network to inform a cell capability of TDD configuration change. Once a UE receives the adaptive TDD indication/notification from the cell, the UE should interpret this indication as a sign that the TDD configuration in the cell may be different from the TDD configuration in its SIB1.

FIG. 5 illustrates the first solution and four different embodiments of providing an adaptive TDD indicator. In a first embodiment, the adaptive TDD indicator is carried in the system information block to inform RRC idle and RRC connected UEs about the TDD adaptation capability of the cell (step 511). For example, the adaptive TDD indication is carried in SIB1. If this indicator is set "ON", then UE knows that the TDD configuration in the cell may be different from the TDD configuration in SIB1.

In a second embodiment, the adaptive TDD indicator is embedded in those reference signals that need to be detected before performing measurements on cell-specific reference signal (CRS). Primary Synchronization Signal (PSS) and Secondary Synchronization Signal (SSS) are reference signals of this kind. For example, in step 512, UE 501 performs synchronization with eNB 502 before performing measurements. During the synchronization process, UE 501 detects PSS and SSS and determines frame boundary. Take SSS as an example, the adaptive TDD indicator can be embedded in the TDD SSS sequence. Once UE 501 detects the TDD SSS sequence, UE 501 knows whether the cell is a TDD adaptation capable cell.

Specifically, the adaptive TDD indicator can be embedded in a scrambling sequence (i.e. the scrambling sequence is a function of the adaptive TDD indicator) contained in the SSS sequence. By detecting the scrambling sequence contained in the SSS sequence, the UE can determine the cell TDD adaption information. For example, the scrambling code representing the TDD adaption can be contained in even-number indices of the SSS sequence, odd-number indices of the SSS sequence, or both even-number indices and odd-number indices of the SSS sequence. The set of information carried by SSS sequences and the set of SSS sequences shall be one-to-one and onto.

More specifically, let $$A = \{(N_{ID}^{(1)}, p) : 0 \leq N_{ID}^{(1)} \leq 167, p = 0, 1\},$$

Function $f: A \to B$ where
   p denotes the adaptive TDD indicator;
   $(N_{ID}^{(1)}, p)$ represents the information carried by an SSS sequence;
   A denotes the set of information carried by SSS sequences; and
   B denotes the set composed of all SSS sequences.
Then function f shall be one-to-one and onto. First, for any two different configurations of $(N_{ID}^{(1)}, p)$, their corresponding SSS sequences are different. Second, any SSS sequence corresponds to a configuration $(N_{ID}^{(1)}, p)$.

In a first Example, assume sequence $d(0), \ldots, d(61)$ carries the information of $N_{ID}^{(1)}$ and is contained in the SSS sequence. The adaptive TDD information is embedded in a length-31 sequence $i(0), \ldots i(30)$. The sequence $i(n)$ can be applied to either the even-number indices elements $d(2n)$ with the output $d'(2n)$, or the odd-number indices elements $d(2n+1)$ with the output $d'(2n+1)$, or both. That is, $$d'(2n)=d(2n)i_0^{(p)}(n) \quad (1)$$

and/or $$d'(2n+1)=d(2n+1)i_1^{(p)}(n) \quad (2)$$

where $p \in \{0,1\}$, $0 \leq n \leq 30$, and $i_k^{(p)}(n)$ (k is 0 or 1) is an m-sequence with the cyclic shift depending on the value of p or can be other sequence with good auto-correlation properties.

In a second Example, sequence i(0), . . . , i(61) is a length-62 scrambling sequence carrying the adaptive TDD information. The sequence i(n) can be applied to d(0), . . . , d(61) (the sequence d(n) is as explained in the first example with the output d'(n). That is, $$d'(n)=d(n)i(n) \quad (3)$$

where $0 \leq n \leq 61$.

Referring back to FIG. 5, in a third embodiment, the adaptive TDD indicator is carried in an RRC message to inform RRC connected UEs (step 513). For example, the indicator can be carried in a Radio Resource Configuration Common information element or Radio Resource Configuration Common information element for SCELL in the mobility control information in the RRC Connection Reconfiguration signaling message.

In a fourth embodiment, the adaptive TDD indicator is exchanged between eNBs through X2-AP. For example, in step 514, eNB 503 sends an adaptive TDD indicator to eNB 502 in eNB configuration update. Once serving eNB 502 receives the adaptive TDD indicator setting "ON" from the neighbor cell, eNB 502 then indicates such capability to its served/camped UEs. Typically, to assist UE measurement on neighbor cells, eNB indicates the TDD configuration of the neighbor cells through NeighCellConfig in RRC signaling for connected UEs. However, the information carried in NeighCellConfig is quite simple: neighbor cell's TDD configuration is the same as or different from the Primary cell of the eNB. Here, in addition to this information, eNB should indicate whether the neighbor cells are adaptive TDD cells to the UE through NeighCellConfig information element in RRC Connection Reconfiguration (for connected UEs) (e.g., in step 515), or through SIB 3 and SIB5 via broadcasting (for idle UEs).

In step 516, UE 501 performs measurement over the serving cell or neighboring cells after receiving the adaptive TDD indicator. If the UE knows that the to-be-measured cell does not have adaptive TDD capability, then UE 501 performs measurements according to the current TDD configuration (e.g., in SIB1). Otherwise, if the UE knows that the to-be-measured cell has adaptive TDD capability, but does not know the current operating TDD configuration, then the UE needs to take precaution when performing measurements. For example, UE 501 performs measurements only on the unchangeable DL subframes, e.g., subframes #0 and #5. Finally, in step 517, UE 501 sends measurement report to serving eNB 502.

Figure 6:
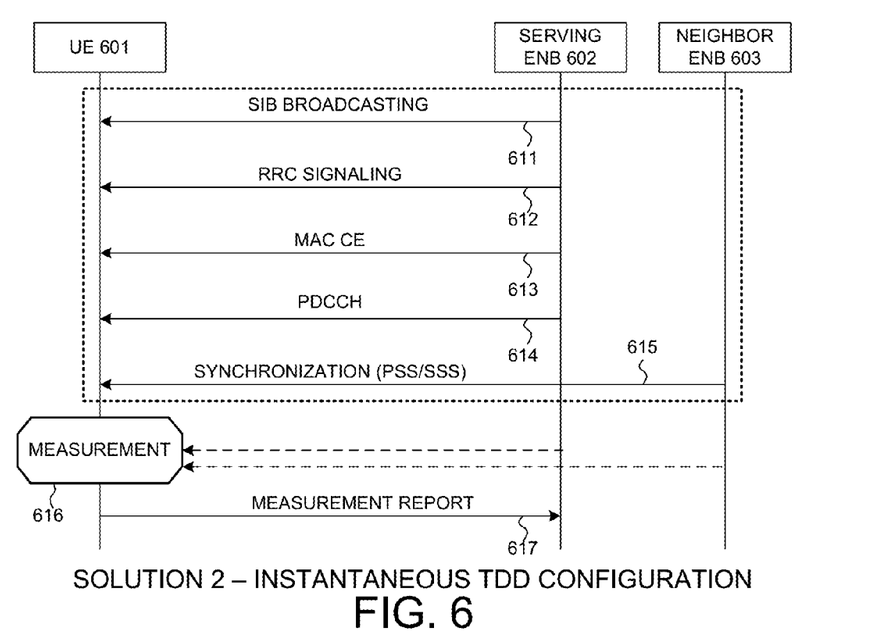
FIG. 6 illustrates a second solution of providing instantaneous TDD configuration.

FIG. 6 illustrates a second solution of providing instantaneous TDD configuration. Under the first solution, the adaptive TDD indicator indicates the capability of TDD adaptation of a cell. However, such indicator does not provide the current operating TDD configuration of the cell. FIG. 6 illustrates the second solution and five different embodiments of providing instantaneous TDD configuration pattern of a cell. In a first embodiment, the instantaneous TDD configuration pattern is carried in the system information, e.g., SIB1, broadcasted from eNB 602 to UE 601 (step 611). Similar to the ETWS/CMAS indication or notification, a paging message is used to inform the RRC idle UEs and RRC connected UEs about the TDD configuration change. If UE 601 receives a paging message including TDD configuration change indication, it shall read SIB1 to update the TDD configuration of its serving/camping cell.

In a second embodiment, the instantaneous TDD configuration pattern is carried in dedicated signaling. For example, in step 612, the TDD configuration is carried in RRC message—the RRC connection reconfiguration procedure is applied when the TDD configuration is changed. RRC connected UEs to the adaptive TDD cell can be informed by RRC signaling.

In a third embodiment, the instantaneous TDD configuration pattern is carried by MAC control element. For example, in step 613, a MAC control element is designed to carry the TDD configuration pattern. Because there are seven TDD configuration patterns defined in the current LTE specification, at least three bits are designed to indicate the TDD configuration index. The remaining five bits in the MAC control element are left for future extension. For example, they can be used to indicate the new TDD configuration will take effect after how many radio frames. If the MAC CE for TDD is configured, then the TDD configuration in the MAC CE overrides the TDD configuration in the RRC message and/or SIB1.

In a fourth embodiment, the instantaneous TDD configuration pattern is carried by PDCCH signaling. For example, in step 614, a three-bit TDD configuration is carried in the PDCCH signaling. In addition, when the new TDD configuration will be applied is also carried in the PDCCH signaling. In one example, m bits in PDCCH is used to indicate the least significant bit (LSB) of the system frame number (SFN) that the new TDD configuration will be applied. In another example, m bits in PDCCH is used to indicate the relative timing of the new TDD configuration being applied from the new TDD configuration notification being received. If the new TDD configuration notification is received in subframe n and the m bits indicating relative timing in PDCCH represents k, then the new TDD configuration will be applied in n+k subframe. If the TDD configuration field is present in PDCCH, then the TDD configuration in PDCCH overrides the TDD configuration carried in the RRC message and/or SIB1.

In a fifth embodiment, the instantaneous TDD configuration is embedded in the reference signal that should be detected by UE before performing measurements on CRS. For example, in step 615, UE 601 performs synchronization with eNB 602 or eNB 603 by detecting PSS and SSS, and the TDD configuration pattern is scrambled in the TDD subframe #0 and #5. UE 601 first determines whether a cell is a TDD adaptive cell by detecting the adaptive TDD indicator embedded in the SSS. Once the frame boundary is determined (PSS and SSS are detected), and it indicates that the cell is a TDD adaptive cell, UE 601 can then detects the reference signaling in subframe #0 and #5 to determine the TDD configuration embedded in the reference signal. The set of information carried by SSS sequences and the set of SSS sequences shall be one-to-one and onto.

More specifically, let $$A=\{(N_{ID}^{(1)},\{p\}):0 \leq N_{ID}^{(1)} \leq 167\},$$

$$f:A \to B$$

where
  p denotes the set of parameters governing the instantaneous TDD configuration pattern;

($N_{ID}^{(1)}$,{p}) represents the information carried by an SSS sequence;

A denotes the set of information carried by SSS sequences; and

B denotes the set composed of all SSS sequences.

Then function f shall be one-to-one and onto. First, for any two different configurations of ($N_{ID}^{(1)}$,{p}), their corresponding SSS sequences shall be different. Second, any SSS sequence corresponds to a configuration ($N_{ID}^{(1)}$,{p}).

In one example, the adaptive TDD indication can be embedded in the even/odd SSS sequence and the TDD configuration pattern can be embedded in the odd/even SSS sequence. Sequence d(0), . . . , d(61) used for the second synchronization signal is an interleaved concatenation of two length-31 binary sequences. Two sequences i(n) and j(n) are a length-31 scrambling sequence embedded with the adaptive TDD information, where i(n) carries the adaptive TDD indication and j(n) carries the TDD configuration patterns. For instance, the sequence i(n) can be applied to the even sequence d(2n) with the output d'(2n), and j(n) can be applied in the odd sequence d(2n+1) with the output d'(2n+1). That is, $$d'(2n)=d(2n)i^{(p)}(n) \quad (4)$$

and/or $$d'(2n+1)=d(2n+1)j^{(q)}(n) \quad (5)$$

where p∈{0,1}, q∈{0, 1, 2, 3, 4, 5, 6}, 0≤n≤30, and $i^{(p)}(n)$ can be an m-sequence with the cyclic shift depending on the value of p, $j^{(q)}(n)$ can be an m-sequence with the cyclic shift depending on the value of q. Alternatively, $i^{(p)}(n)$ and/or $j^{(q)}(n)$ can be other sequences with good auto-correlation properties.

UE 601 may apply a two-step detection or a one-step detection process for detecting adaptive TDD configuration information. In a two-step detection process, the UE first detects the TDD adaptation indicator embedded in the reference signal. If detected, the UE further detects the TDD configuration embedded in the reference signal. In a one-step detection process, three binary bits are introduced to carry the seven TDD configuration patterns and one for non-adaptation case. For example, 000 indicates TDD configuration #0, 001 indicates TDD configuration #1 . . . 110 indicates TDD configuration #7, and 111 indicates non-adaptive TDD.

After receiving the instantaneous TDD configuration, in step 616, UE 601 performs measurement over the serving cell or neighboring cells. If UE 601 knows the current operating TDD configuration of the to-be-measured cell, then UE 601 performs measurements according to the current operating TDD configuration. Otherwise, if the UE does not know the current operating TDD configuration, but the UE knows that the to-be-measured cell has adaptive TDD capability, then the UE needs to take precaution when performing measurements. For example, UE 601 performs measurements only on the unchangeable DL subframes, e.g., subframe #0 and #5. Finally, in step 617, UE 601 sends measurement report to serving eNB 602.

Figure 7:
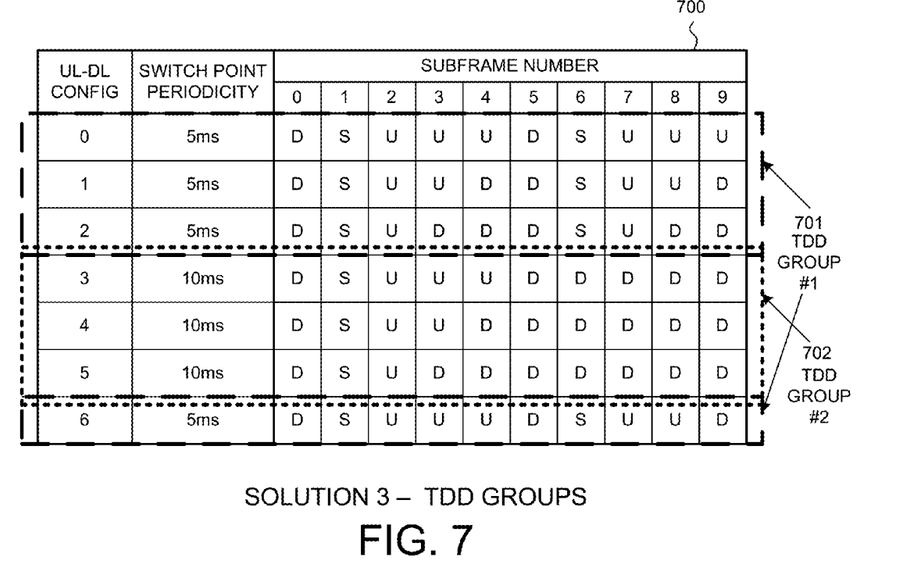
FIG. 7 illustrates a third solution of grouping TDD configurations into TDD groups.

FIG. 7 illustrates a third solution of grouping TDD configurations into TDD groups. Different TDD configurations can be divided into TDD groups. The TDD adaptation can be applied within the same TDD group. The TDD grouping can be done by different criteria. In the example of table 700 of FIG. 7, TDD configurations with the same DL-to-UL switch point periodicity can be formed as a TDD group. For example, TDD configuration #0, #1, #2, and #6 are with 5 ms DL-to-DL switch point periodicity and they are formed as TDD group #1 (as depicted by long-dashed box 701), and TDD configuration #3, #4, and #5 are with 10 ms DL-to-UL switch point periodicity and they are formed as TDD group #2 (as depicted by short-dashed box 702). Within TDD group #1, an eNB can change its TDD configuration #0 to TDD configuration #1, #2, or #6. Within TDD group #2, eNB can change its TDD configuration #3 to TDD configuration #4 or #5. The eNB can inform UEs such TDD grouping. Once a UE knows the TDD grouping, the UE can perform measurements on the common DL subframes within the same TDD group. For example, if the UE knows that the to-be-measured cell belongs to TDD group #1, then the UE can perform DL measurements on the common DL subframes #0 and #5. If the UE knows that the to-be-measured cell belongs to TDD group #2, then the UE can perform DL measurements on the common DL subframes #0, #5, #6, #7, #8, and #9.

Figure 8:
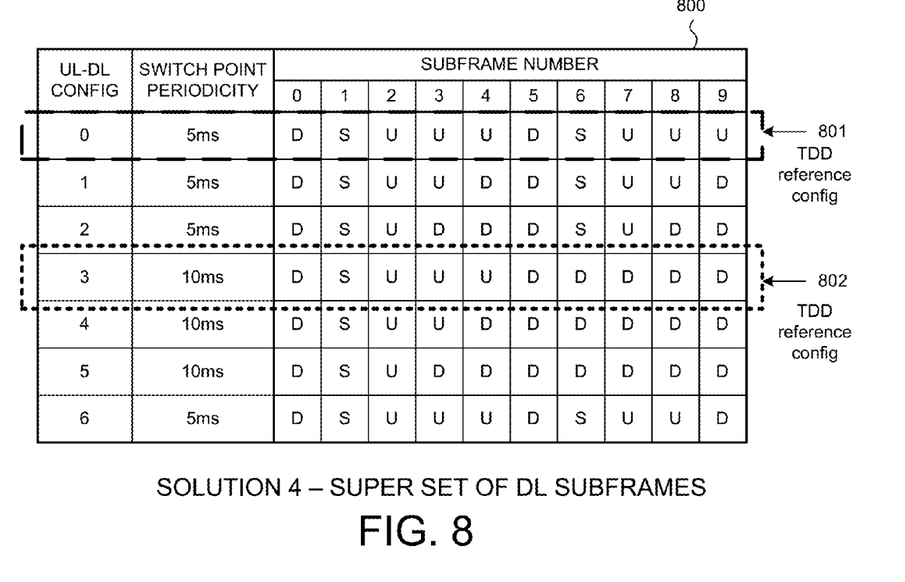
FIG. 8 illustrates a fourth solution of adaptive TDD configuration with super set constraint.

FIG. 8 illustrates a fourth solution of adaptive TDD configuration with DL super set constraint. In an adaptive TDD cell, the TDD configuration broadcasted in SIB1 may be different from the operating TDD configuration. If the change of TDD configuration is notified by dedicated signaling e.g. RRC, MAC, or PDCCH signaling, then RRC connected UEs may do the measurements based on the up-to-date TDD configuration. However, RRC idle UEs may do the measurements based on SIB. As a result, for all UEs to perform measurements on the correct DL subframe, the DL subframes of the instantaneous TDD configuration needs to be a super set of the DL subframes broadcasted in SIB1 of the cell. In the example of table 800 of FIG. 8, if a cell broadcasts TDD configuration #0 in its SIB1 as indicated by box 801, then the cell can configure its TDD configuration as configuration #0, #1, #2, #3, #4, #5, or #6. This is because TDD configuration #0 contains the least DL subframes (e.g., subframes #0 and #5), and other TDD configurations #1, #2, #3, #4, #5, and #6 have more DL subframes including the common DL subframes #0 and #5 that are broadcasted in SIB1. If a cell broadcasts TDD configuration #3 in its SIB1 as indicated by box 802, then the cell can configure its TDD configuration as configuration #3, #4, or #5. This is because TDD configuration #3 contains the least DL subframes (e.g., subframes #0, #5, #6, #7, #8, and #9), and the other TDD configurations #4 and #5 have more DL subframes including the common DL subframes #0, #5, #6, #7, #8, and #9 that are broadcasted in SIB1. Therefore, as long as the network changes its TDD configuration with DL subframe super set constraint, the UE is then able to perform measurements on the DL subframes according to the TDD configuration broadcasted in SIB1.

The TDD configuration with the least DL subframes is referred to as a TDD reference configuration. The TDD reference configuration is then broadcasted in SIB1. The fourth solution of DL subframe super set is an extension of the third solution of TDD grouping. The TDD reference configuration and other TDD configurations form a special TDD group. Within the special TDD group, the TDD reference configuration has the least DL subframes, and the DL subframes of each of the other TDD configurations in the special TDD group form a super set of the DL subframes of the TDD reference configuration. Once the base station broadcasts the TDD reference configuration in SIB1, UE is able to perform measurements on the DL subframes according to the TDD reference configuration as long as the network adapts TDD configuration within the special TDD group, e.g., with DL super set constraint. Referring back to FIG. 8, if TDD configuration #0 is broadcasted in SIB1 as the TDD reference configuration (box 801), then the other TDD configurations #1, #2, #3, #4, #5, and #6 together with TDD reference configuration #0 form a special TDD group. The eNB may adapt its TDD configuration to any TDD configuration within the special TDD group. Similarly, if TDD configuration #3 is broadcasted in SIB1 as the TDD reference configuration (box 802), then the other TDD configurations #4 and #5 together with TDD reference configuration #3 form a special TDD group. The eNB may adapt its TDD configuration to any TDD configuration within the special TDD group.

The fourth solution of DL subframe super set constraint can also be applied together with the third solution of TDD grouping. For example, in TDD group #1 with DL-to-UL switch point periodicity 5 ms, a cell broadcasts its TDD configuration #0, which is with the least DL subframes in the group, in SIB1, and then the cell can adapt its TDD configuration to TDD configurations #1, #2, or #6 within the same TDD group #1.

Figure 9:
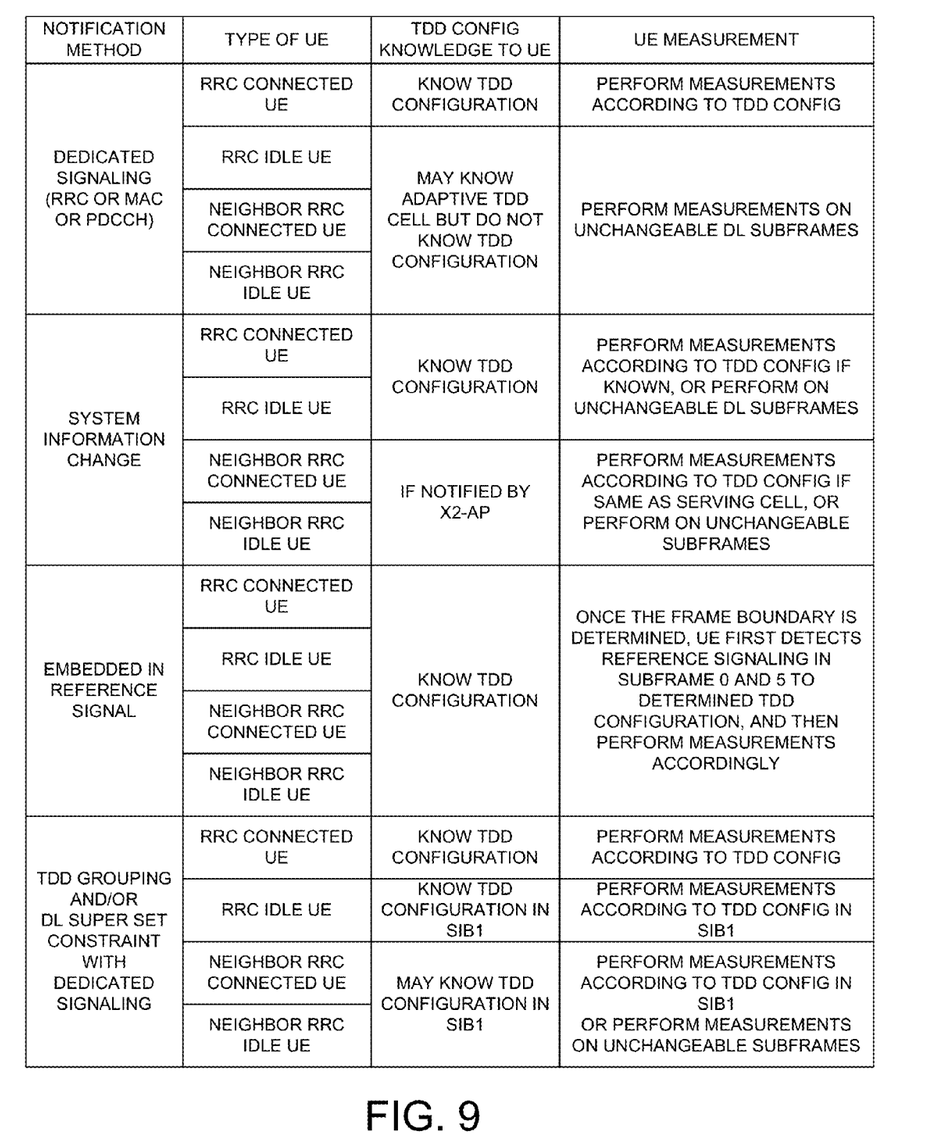
FIG. 9 illustrates various UE measurement behavior based on different adaptive TDD notification methods.

Under the different methods of providing adaptive TDD notification to UE, UE measurement behavior is also different depending on UE's knowledge of a cell's actual TDD adaptation capability and configuration. In addition, UE measurement behavior depends upon different UE types, e.g., RRC connected UE, RRC idle UE, neighbor RRC connected UE, or neighbor RRC idle UE. FIG. 9 illustrates various UE measurement behavior based on different adaptive TDD notification methods.

In a first notification method, the network notifies UEs adaptive TDD information via dedicated signaling, i.e., through RRC message or MAC message or PDCCH. An RRC connected UE served by this adaptive TDD cell knows the exact TDD configuration pattern, and thus can perform measurements on the DL subframes according to the informed TDD pattern. An RRC idle UE camped in this adaptive TDD cell may know that the camped cell is an adaptive TDD cell, but does not know the actual TDD pattern, thus should perform measurements on the unchangeable DL subframes, e.g., subframe #0 and #5. Similarly, a neighbor RRC connected or a neighbor RRC idle UE knows the neighbor cell is an adaptive TDD cell, but does not know the actual TDD pattern, thus should perform measurements on the unchangeable DL subframes, e.g., subframe #0 and #5.

In a second notification method, the network notifies UE adaptive TDD information via system information change procedure, e.g., via SIB1. An RRC connected or an RRC idle UE knows the exact TDD configuration pattern, and thus can perform measurements on the DL subframes according to the informed TDD pattern. On the other hand, a neighbor RRC connected or a neighbor RRC idle UE should be notified by the X2-AP. If the TDD configuration is different from the serving cell, the UE should perform measurements on DL subframes #0 and #5. If the TDD configuration is the same as the serving cell, the UE should perform measurements on the exact DL subframes.

In a third notification method, the network notifies UE adaptive TDD information by embedding the information in reference signals. For all types of UE, the UE can resolve the TDD configuration pattern. Once the frame boundary is determined, the UE can first detect the reference signaling in subframe #0 and #5 to determine the TDD configuration embedded the RS. Once TDD configuration is determined, the UE can perform measurements on the DL subframes according to the TDD pattern.

In a fourth notification method, the network notifies the UE TDD grouping and/or the TDD reference configuration with DL super set constraint. For RRC connected UE served by this adaptive TDD cell, it knows the TDD configuration pattern and thus can perform measurements on the DL subframes according to the informed TDD pattern. For RRC idle UE camped in this adaptive TDD cell, it knows that the camped cell is an adaptive TDD cell, but does not know the actual TDD pattern, thus can perform measurements on common DL subframes within the same TDD group, or on DL subframes according to the TDD reference configuration broadcasted in SIB1. For neighbor RRC connected and neighbor RRC idle UE, it does not know the actual TDD pattern. If the neighbor UE knows TDD grouping information or knows TDD reference configuration of SIB1 of this neighbor cell, then the neighbor UE can perform measurements on common DL subframes within the same TDD group, or on DL subframes according to TDD reference configuration broadcasted in SIB1.

If TDD configuration is static, then UE can perform the CRS measurement on the DL subframes directly. However, if the exact TDD configuration is not known at UE, when some DL subframes may switch to UL subframes, the UE should first perform reference signal detection to detect whether the reference signal exists or not in the concerned subframes. Although UE could always measure the common DL subframes, if UE can measure on more DL subframes, it helps to shorten the collecting time of measurement samples. In other words, given a period, UE can collect more samples for more accurate measurements.

The hypothesis testing is given as:

$$Y_k = R_k \alpha_k^* = \begin{cases} 1_{k,data} \cdot \sum_t H_k^{(t)} d_k^{(t)} \alpha_k^* + n_k \alpha_k^*, & \text{if } CRS \text{ is absent} \\ H_k^{(t)} + n_k \alpha_k^* & \text{if } CRS \text{ is present} \end{cases} \quad (Y)$$

where
- $H_k^{(t)}$ is the frequency response from the $t^{th}$ antenna port to the UE;
- $d_k^{(t)}$ represents the data transmitted from the $t^{th}$ antenna port, each element of the CRS sequence $\{\alpha_k\}$ has unit norm; and
- $1_{k,data}$ is equal to 1 if the corresponding resource element (RE) carries data, and 0 otherwise.

However, UE has no idea whether CRS resource blocks (RBs) are assigned with UL transmission or not. In some cases, especially in small cells, UEs performing UL transmission in the associated RBs may be quite near UEs performing measurements. Therefore, the noise and interference level detected by the measuring UEs may be high. If a UE uses the same reference signaling detection criterion for no UL transmission in CRS RBs to detect the UL transmission in CRS RBs, higher probability of false alarm is expected.

Figure 10A:
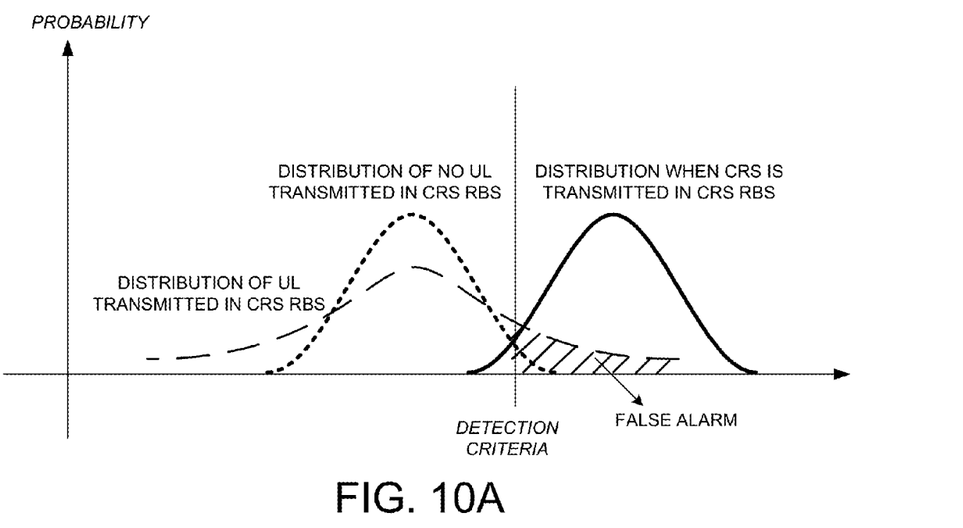
FIG. 10A illustrates the probability distribution when reference signal is transmitted in CRS RBs.

FIG. 10A illustrates the probability distribution when reference signal is transmitted in CRS RBs. As illustrated in FIG. 10A, where the solid curve shows the distribution when CRS is transmitted in the CRS RBs, dotted curve represents the distribution of no transmission in CRS RBS in the case of DL subframes switching to UL subframe, and the dashed curve depicts the distribution of UL transmissions in CRS RBs.

Figure 10B:
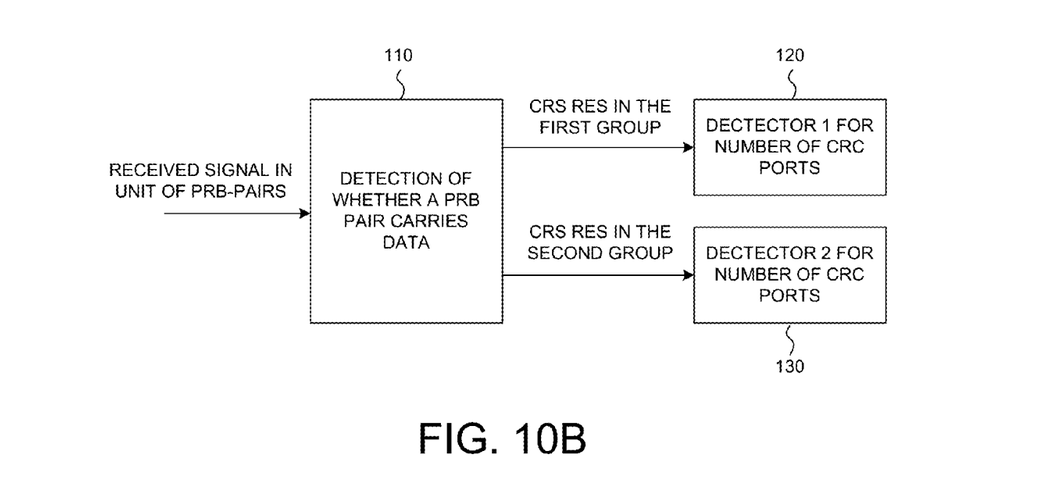
FIG. 10B illustrates one embodiment of reference signal detection when UE does not know the exact TDD configuration to the measured cell.

FIG. 10B illustrates one embodiment of reference signal detection when UE does not know the exact TDD configuration to the measured cell. FIG. 10B depicts the flow chart for solving the detection problem given in equation (Y). The basic idea is that the detector (at least the detector threshold)

to solving (Y) should not be the same for whether data are present in $R_k$'s or not. Within the time and frequency region on which the presence of CRS is to be detected, a UE first detects whether there may be any signal sent on the CRS REs of the CRS port 0. There are two possible detection outcomes: signal presence and signal absence. The CRS REs of the CRS 0 are categorized into two groups according to the signal-presence detection result. Specifically, those CRS REs located in a PRB-pair with detection result of signal absence are classified into the first group; those in a PRB-pair with signal presence are classified into the second group. Each group of CRS REs are fed to a detector for the existence of CRS.

In step 110, radio signals are first received in unit of PRB-pairs and detected whether a PRB-pair carries data. For each PRB-pair within the time and frequency region on which the presence of CRS will be detected, the UE detects whether this PRB-pair carries PUSCH by observing the received signals at REs fulfilling all of the following conditions: 1) Located at the OFDM symbol with the index (counting from 0) equal to or larger than four for channel bandwidth 1.4 MHz and with the index equal to or larger than 3 for other channel bandwidths; 2) Not occupied by CRS of ports #0, 1, 2, 3; and 3) Not occupied by PSS, SSS, PBCH, or PRS.

Let us represent the frequency domain received signal as $R_l$ for the l-th observation. The associated hypothesis testing is $$\mathcal{H}_0 : R_l = n_l, \quad (Z)$$
$$l = 0, 1, \ldots, L-1$$
$$\mathcal{H}_1 : R_l = \sum_t H_l^{(t)} d_l^{(t)} + n_l,$$
$$l = 0, 1, \ldots, L-1$$

where
$\mathcal{H}_0$ corresponds to 'Signal absence'
$\mathcal{H}_1$ corresponds to 'Signal presence'

In step 120, the number of CRS ports are detected. Based on the testing of equation (Z), $\{Y_k\}$ in equation (Y) can be divided into two groups. The first group (i.e., unoccupied subframe) corresponds to hypothesis testing $$Y_k = \begin{cases} n_k \alpha_k^*, & \text{under } \mathcal{H}_0 \\ H_k^{(i)} + n_k \alpha_k^*, & \text{under } \mathcal{H}_1 \end{cases}$$

and the second group (i.e., occupied subframe) corresponds to $$Y_k = \begin{cases} \sum_t H_k^{(t)} d_k^{(t)} \alpha_k^* + n_k \alpha_k^*, & \text{under } \mathcal{H}_0 \\ H_k^{(i)} + n_k \alpha_k^*, & \text{under } \mathcal{H}_1 \end{cases}$$

where $\mathcal{H}_0$ and $\mathcal{H}_1$ refer to 'CRS absence' and 'CRS presence', respectively.

Figure 11:
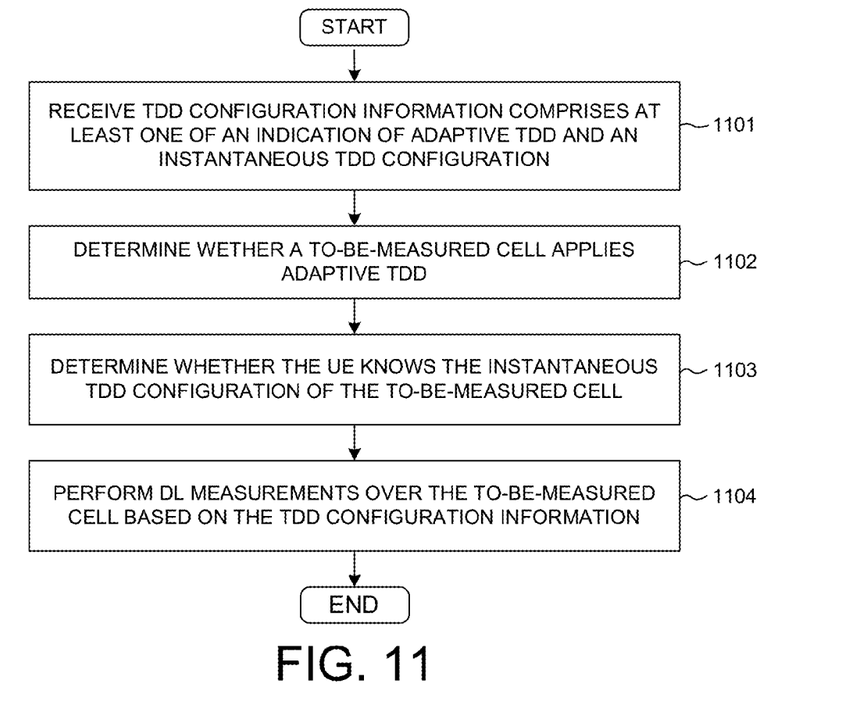
FIG. 11 is a flow chart of a method of receiving adaptive TDD configuration information from UE perspective in accordance with one novel aspect.

FIG. 11 is a flow chart of a method of receiving adaptive TDD configuration information from UE perspective in accordance with one novel aspect. In step 1101, a user equipment (UE) receives TDD configuration information from a base station in a mobile communication network. The TDD configuration information comprises at least one of an indication of adaptive TDD and an instantaneous TDD configuration. In step 1102, the UE determines whether a to-be-measured cell applies adaptive TDD. In step 1103, the UE determines whether it knows the instantaneous TDD configuration of the to-be-measured cell. In step 1104, the UE performs measurements over the to-be-measured cell based on the TDD configuration information.

Figure 12:
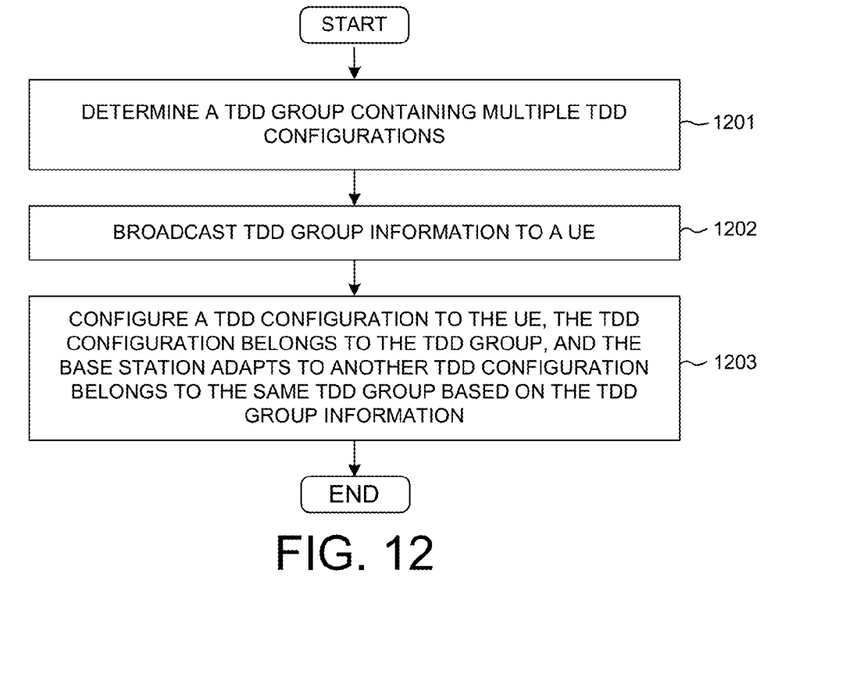
FIG. 12 is a flow chart of a method of providing adaptive TDD configuration information from eNB perspective in accordance with one novel aspect.

FIG. 12 is a flow chart of a method of providing adaptive TDD configuration information from eNB perspective in accordance with one novel aspect. In step 1201, a base station determines a TDD group containing multiple TDD configurations. In step 1202, the base station broadcasts TDD group information to a UE. In step 1203, the base station configures a TDD configuration to the UE. The TDD configuration belongs to the TDD group, and the base station may adapt to another TDD configuration belongs to the same TDD group based on the TDD group information. In one embodiment, the broadcasted TDD group information comprises a TDD reference configuration. The DL subframes of each of the multiple TDD configurations in the TDD group form a super set of the DL subframes of the broadcasted TDD reference configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
receiving time division duplex (TDD) configuration information by a user equipment (UE) in a mobile communication network, wherein the TDD configuration information comprises at least one of an adaptive TDD indication and an instantaneous TDD configuration;
determining whether a to-be-measured cell applies adaptive TDD and performing downlink (DL) measurements over the to-be-measured cell by the UE according to a current TDD configuration of the to-be-measured cell if adaptive TDD is not configured;
determining whether the UE knows the instantaneous TDD configuration of the to-be-measured cell; and
performing DL measurements over the to-be-measured cell by the UE, wherein the UE only measures on common DL subframe(s) if adaptive TDD is applied and the UE does not know the instantaneous TDD configuration of the to-be-measured cell, wherein the UE is served by a serving cell different from the to-be-measured cell, and the TDD configuration information comprises the instantaneous TDD configuration of the to-be-measured cell, the method further comprising:
performing measurements only on the common DL subframe(s) if the instantaneous TDD configuration is different from a TDD configuration of the serving cell; and
performing measurements on the same subframe(s) as on the serving cell if the instantaneous TDD configuration is the same as the TDD configuration of the serving cell.
2. The method of claim 1, wherein the adaptive TDD indication is carried in system information block broadcasted by the network.

3. The method of claim 1, wherein the adaptive TDD indication is carried in a radio resource control (RRC) message.

4. The method of claim 1, wherein the instantaneous TDD configuration is carried by physical downlink control channel (PDCCH) signaling.

5. The method of claim 1, further comprising:
determining the to-be-measured cell belonging to a TDD group containing multiple TDD configurations; and
performing measurements on the common DL subframe(s) of the TDD group.

6. The method of claim 1, wherein the adaptive TDD indication and/or the instantaneous TDD configuration is embedded in a reference signal detected before performing measurements.

7. The method of claim 1, wherein the common DL subframe(s) is the DL subframe(s) broadcasted in the TDD configuration information in the system information.

8. The method of claim 1, wherein the common DL subframe(s) is the common DL subframe(s) across TDD UL-DL configuration groups.

9. The method of claim 8, wherein the common DL subframes are subframe #0 and subframe #5.

10. A user equipment (UE) comprising:
a radio frequency (RF) receiver that receives time division duplex (TDD) configuration information by a user equipment (UE) in a mobile communication network, wherein the TDD configuration information comprises at least one of an adaptive TDD indication and an instantaneous TDD configuration;
a TDD configuration circuit that determines whether a to-be-measured cell applies adaptive TDD, wherein the UE also determines whether the UE knows the instantaneous TDD configuration of the to-be-measured cell; and
a measurement circuit that performs downlink (DL) measurements over the to-be-measured cell by the UE according to a current TDD configuration of the to-be-measured cell if adaptive TDD is not configured, wherein the UE only measures on common DL subframe(s) if adaptive TDD is applied and the UE does not know the instantaneous TDD configuration of the to-be-measured cell,
and wherein the UE is served by a serving cell different from the to-be-measured cell, and the TDD configuration information comprises the instantaneous TDD configuration of the to-be-measured cell, the measurement circuit performs measurements only on the common DL subframe(s) if the instantaneous TDD configuration is different from a TDD configuration of the serving cell, and the measurement circuit performs measurements on the same subframe(s) as on the serving cell if the instantaneous TDD configuration is the same as the TDD configuration of the serving cell.

11. The UE of claim 10, wherein the adaptive TDD indication is carried in system information block broadcasted by the network.

12. The UE of claim 10, wherein the adaptive TDD indication is carried in a radio resource control (RRC) message.

13. The UE of claim 10, wherein the instantaneous TDD configuration is carried by physical downlink control channel (PDCCH) signaling.

14. The UE of claim 10, wherein the TDD configuration circuit determines the to-be-measured cell belonging to a TDD group containing multiple TDD configurations, and wherein the measurement circuit performs measurements on the common DL subframe(s) of the TDD group.

15. The UE of claim 10, wherein the adaptive TDD indication and/or the instantaneous TDD configuration is embedded in a reference signal detected before performing measurements.

16. The UE of claim 10, wherein the common DL subframe(s) is the DL subframe(s) broadcasted in the TDD configuration information in the system information.

17. The UE of claim 10, wherein the common DL subframe(s) is the common DL subframe(s) across TDD UL-DL configuration groups.

18. The UE of claim 17, wherein the common DL subframes are subframe #0 and subframe #5.

* * * * *